US011865810B2

(12) United States Patent
Cui et al.

(10) Patent No.: US 11,865,810 B2
(45) Date of Patent: Jan. 9, 2024

(54) RADIATIVE-HEATING CLOTHING FABRIC WITH COLORS

(71) Applicant: LifeLabs Design, Inc., Sunnyvale, CA (US)

(72) Inventors: Yi Cui, Stanford, CA (US); Lili Cai, Champaign, IL (US)

(73) Assignee: LifeLabs Design, Inc., Sunnyvale, CA (US)

(*) Notice: Subject to any disclaimer, the term of this patent is extended or adjusted under 35 U.S.C. 154(b) by 359 days.

(21) Appl. No.: 16/406,964

(22) Filed: May 8, 2019

(65) Prior Publication Data
US 2020/0353720 A1 Nov. 12, 2020

(51) Int. Cl.
| B32B 15/085 | (2006.01) |
| B32B 27/32 | (2006.01) |
| B32B 15/14 | (2006.01) |
| B32B 15/02 | (2006.01) |

(52) U.S. Cl.
CPC ............ *B32B 15/085* (2013.01); *B32B 15/02* (2013.01); *B32B 15/14* (2013.01); *B32B 27/32* (2013.01); *B32B 2305/026* (2013.01); *B32B 2305/30* (2013.01); *B32B 2307/4026* (2013.01); *B32B 2307/414* (2013.01); *B32B 2307/416* (2013.01); *B32B 2437/00* (2013.01)

(58) Field of Classification Search
CPC ...... A41D 31/00; A41D 31/06; A41D 31/065; A41D 31/02; A41D 31/04; B32B 15/04; B32B 5/024; B32B 2250/40; B32B 2255/205; B32B 2250/05
See application file for complete search history.

(56) References Cited

U.S. PATENT DOCUMENTS

| 2006/0099431 A1 | 5/2006 | Scholz |
| 2009/0119822 A1* | 5/2009 | Sueto .................... A41B 17/00 2/400 |
| 2012/0276332 A1 | 11/2012 | Connolly et al. |

(Continued)

FOREIGN PATENT DOCUMENTS

WO WO-2017143222 A1 * 8/2017 ............... D01F 6/62

OTHER PUBLICATIONS

Cai et al., Spectrally Selective Nanocomposite Textile for Outdoor Personal Cooling, Advanced Materials, vol. 30, Article No. 1802152, Jun. 17, 2018, pp. 1-7.

(Continued)

*Primary Examiner* — Alicia J Weydemeyer (57) ABSTRACT

A spectrally-selective clothing fabric is disclosed. The clothing fabric can comprise an outer layer, an intermediate layer, and an inner layer. The outer layer can be infrared-transmissive and can comprise a polyolefin fiber and particulate fillers dispersed within the polyolefin fiber. The intermediate layer can comprise an infrared-reflective porous metallic-film on an inner surface of an infrared-transmissive porous polyolefin-membrane, wherein the porous polyolefin membrane is coupled to an inner surface of the outer layer. The inner layer can comprise a fabric coupled to an inner surface of the porous metallic film. The particulate fillers can comprise inorganic particles having an average particle size in a range of 10 nm to 4,000 nm. The porous metallic film can have pores having an average pore size in a range of 10 nm to 4,000 nm.

16 Claims, 3 Drawing Sheets

(56) References Cited

U.S. PATENT DOCUMENTS

| | | | |
|---|---|---|---|
| 2014/0356574 A1* | 12/2014 | Conolly | B32B 5/24 |
| | | | 428/138 |
| 2016/0331054 A1* | 11/2016 | Coza | A41B 11/00 |
| 2019/0008217 A1 | 1/2019 | Cui et al. | |

OTHER PUBLICATIONS

International Search Report and Written Opinion for PCT/US2020/028488 dated Jul. 20, 2020, 9 pages.

* cited by examiner

RADIATIVE-HEATING CLOTHING FABRIC WITH COLORS

FIELD OF THE DISCLOSURE

This invention relates generally to radiative-heating clothing and, more particularly, to radiative-heating clothing fabrics having inorganic pigment particles that reflect visible colors.

BACKGROUND

Indoor heating, ventilation, and air-conditioning (HVAC) accounts for about one-third of the global energy consumption. Reducing HVAC usage can benefit both the economy and the environment. For example, adjusting a setpoint range of HVAC by about plus or minus four degrees Fahrenheit can save more than about thirty percent of building energy consumption.

Effectively regulating heat flow between the human body and the environment improves thermal comfort and reduces building energy-consumption. Human body heat dissipation has three forms: conduction, convection, and radiation. Of these three dissipation routes, radiation accounts for more than about fifty percent of the total heat loss under normal skin conditions. Traditional textiles trap air around the human body to affect convection or conduction dissipation rates, but do not adequately control heat dissipation from radiation.

Recently, engineered textiles have been shown to passively regulate radiation heat-dissipation for effective human body cooling and warming. However, it remains a major challenge to optimize the engineered textile's wearability (including breathability and water-vapor transmission rate) and attractiveness (through visible color control) without compromising the textile's infrared properties. It is against this background that a need arose to develop the embodiments described in this disclosure.

SUMMARY

The present disclosure describes various embodiments of a clothing fabric. In one embodiment, the clothing fabric comprises an outer layer, an intermediate layer, and an inner layer. The outer layer can comprise a polyolefin fiber and particulate fillers dispersed within the polyolefin fiber. The outer layer can have a transmittance of infrared radiation at a wavelength of 9.5 μm of at least 38 percent.

The intermediate layer can comprise a porous metallic film on an inner surface of a porous polyolefin membrane. The porous polyolefin membrane can be coupled to an inner surface of the outer layer and can have a transmittance of infrared radiation at a wavelength of 9.5 μm of at least 38 percent. The porous metallic film can have a reflectivity of infrared radiation at a wavelength of 9.5 μm of at least 40 percent.

The inner layer can be coupled to the inner surface of the porous metallic film and can comprise a fabric selected from a group consisting of cotton, polyester, silk, wool, down, rayon, linen, nylon, hemp, and mixtures thereof.

In one embodiment, the particulate fillers can have an average particle size in a range of 10 nm to 4,000 nm. In another embodiment, the particulate fillers can comprise at least one of a metalloid, a metal oxide, a metal halide, a metal sulfide, or a metal cyanide. In a further embodiment, the porous metallic film can have pores having an average pore size in a range of 10 nm to 4,000 nm. In an additional embodiment, the particulate fillers can reflect at least one visible color selected from the group consisting of red, orange, yellow, green, blue, purple, black, and white.

In one embodiment, a weight percentage of the particulate fillers within the polyolefin fiber can be at least 0.10 percent. In another embodiment, the particulate fillers can comprise at least one of zinc oxide, ferric ferrocyanide, iron oxide, or silicon. In a further embodiment, the outer layer can have a thickness in a range of 50 μm to 800 μm. In an additional embodiment, the outer layer can be nonwoven, woven, knitted, crocheted, felted, or braided.

In one embodiment, the porous polyolefin membrane can have pores having an average pore size in a range of 10 nm to 4,000 nm. In another embodiment, the average pore size of the pores in the porous polyolefin membrane can be in a range of 50 nm to 1,000 nm. In a further embodiment, a volume percentage of the pores within the porous polyolefin membrane can be at least 5 percent. In an additional embodiment, the porous polyolefin membrane can have a thickness in a range of 5 μm to 500 μm. In yet another embodiment, the thickness of the porous polyolefin membrane can be in a range of 10 μm to 20 μm.

In one embodiment, the porous metallic film can comprise a metal selected from a group consisting of aluminum, silver, copper, nickel, gold, titanium, tungsten, molybdenum, and alloys thereof. In another embodiment, the porous metallic film can have a thickness in a range of 10 nm to 800 nm. In a further embodiment, the thickness of the porous metallic film can be in a range of 100 nm to 200 nm. In an additional embodiment, the porous metallic film can comprise an interconnected-mesh structure.

In one embodiment, the intermediate layer can have an emissivity of infrared radiation at a wavelength of 9.5 μm on an outer surface of the porous polyolefin membrane in a range of 5 percent to 60 percent.

In one embodiment, the inner layer can be nonwoven, woven, knitted, crocheted, felted, or braided. In another embodiment, the clothing fabric can have a water-vapor transmission-rate of at least 0.005 g/cm$^2$/hour. In another embodiment, the clothing fabric can have an opacity to visible light over a wavelength range of 400 nm to 700 nm of at least 40 percent.

Each feature or concept outlined above is independent and can be combined with the other features or concepts outlined above or with any other feature or concept disclosed in this application.

In another embodiment, a clothing fabric comprises a first layer, a second layer, a third layer, a fourth layer, and a fifth layer. The first layer can comprise a polyolefin fiber and particulate fillers dispersed within the polyolefin fiber. The first layer can have a transmittance of infrared radiation at a wavelength of 9.5 μm of at least 38 percent.

The second layer can comprise a first porous metallic film on an inner surface of a first porous polyolefin membrane. The first porous polyolefin membrane can be coupled to an inner surface of the first layer and can have a transmittance of infrared radiation at a wavelength of 9.5 μm of at least 38 percent. The first porous metallic film can have a reflectivity of infrared radiation at a wavelength of 9.5 μm of at least 40 percent.

The third layer can be coupled to an inner surface of the first porous metallic film, and can comprise a fabric selected from a group consisting of cotton, polyester, silk, wool, down, rayon, linen, nylon, hemp, and mixtures thereof.

The fourth layer can comprise a second porous metallic film on an outer surface of a second porous polyolefin membrane. The second porous metallic film can be further coupled to an inner surface of the third layer and can have a reflectivity of infrared radiation at a wavelength of 9.5 μm of at least 40 percent. The second porous polyolefin membrane can have a transmittance of infrared radiation at a wavelength of 9.5 μm of at least 38 percent.

The fifth layer can be coupled to an inner surface of the second porous polyolefin membrane, and can comprise a polyolefin fiber and particulate fillers dispersed within the polyolefin fiber. The fifth layer can have a transmittance of infrared radiation at a wavelength of 9.5 μm of at least 38 percent.

In one embodiment, the particulate fillers in each of the first and fifth layers can have an average particle size in a range of 10 nm to 4,000 nm. In another embodiment, a weight percentage of the particulate fillers within the polyolefin fiber in each of the first and fifth layers can be at least 0.10 percent. In a further embodiment, the particulate fillers in each of the first and fifth layers can comprise at least one of a metalloid, a metal oxide, a metal halide, a metal sulfide, or a metal cyanide. In an additional embodiment, the particulate fillers in each of the first and fifth layers can comprise at least one of zinc oxide, ferric ferrocyanide, iron oxide, or silicon. In yet another embodiment, each of the first layer and the fifth layer can have a thickness in a range of 50 μm to 800 μm. In one embodiment, each of the first layer and the fifth layer can be nonwoven, woven, knitted, crocheted, felted, or braided. In another embodiment, the particulate fillers in each of the first and fifth layers reflect at least one visible color selected from the group consisting of red, orange, yellow, green, blue, purple, black, and white.

In one embodiment, each of the first and second porous polyolefin membranes can have pores having an average pore size in a range of 10 nm to 4,000 nm. In another embodiment, a volume percentage of the pores within each of the first and second porous polyolefin membranes can be at least 5 percent. In a further embodiment, each of the first and second porous polyolefin membranes can have a thickness in a range of 5 μm to 500 μm.

In one embodiment, each of the first and second porous metallic films can comprise a metal selected from a group consisting of aluminum, silver, copper, nickel, gold, titanium, tungsten, molybdenum, and alloys thereof. In another embodiment, each of the first and second porous metallic films can have a thickness in a range of 10 nm to 800 nm. In a further embodiment, each of the first and second porous metallic films can have pores having an average pore size in a range of 10 nm to 4,000 nm. In an additional embodiment, each of the first and second porous metallic films can comprise an interconnected-mesh structure.

In one embodiment, the second layer can have an emissivity of infrared radiation at a wavelength of 9.5 μm on an outer surface of the first porous polyolefin membrane in a range of 5 percent to 60 percent.

In one embodiment, the third layer can be nonwoven, woven, knitted, crocheted, felted, or braided. In another embodiment, the clothing fabric can have a water-vapor transmission-rate of at least 0.005 g/cm²/hour. In a further embodiment, the clothing fabric can have an opacity to visible light over a wavelength range of 400 nm to 700 nm of at least 40 percent.

Each feature or concept outlined above is independent and can be combined with the other features or concepts outlined above or with any other feature or concept disclosed in this application.

In a further embodiment, a clothing fabric comprises an outer layer and an inner layer. The outer layer can comprise a porous metallic film on an inner surface of a polyolefin layer. The polyolefin layer can comprise a polyolefin fiber and particulate fillers dispersed within the polyolefin fiber. In addition, the polyolefin layer can have a transmittance of infrared radiation at a wavelength of 9.5 μm of at least 38 percent. The porous metallic film can have a reflectivity of infrared radiation at a wavelength of 9.5 μm of at least 40 percent.

In one embodiment, the inner layer can be coupled to an inner surface of the porous metallic film, and can comprise a fabric selected from a group consisting of cotton, polyester, silk, wool, down, rayon, linen, nylon, hemp, and mixtures thereof.

In one embodiment, the particulate fillers can have an average particle size in a range of 10 nm to 4,000 nm. In another embodiment, the particulate fillers can comprise at least one of a metalloid, a metal oxide, a metal halide, a metal sulfide, or a metal cyanide. In a further embodiment, the porous metallic film can have pores having an average pore size in a range of 10 nm to 4,000 nm. In an additional embodiment, the particulate fillers can reflect at least one visible color selected from the group consisting of red, orange, yellow, green, blue, purple, black, and white.

In one embodiment, a weight percentage of the particulate fillers within the polyolefin fiber can be at least 0.10 percent. In another embodiment, the particulate fillers can comprise at least one of zinc oxide, ferric ferrocyanide, iron oxide, or silicon. In a further embodiment, the polyolefin layer can have a thickness in a range of 50 μm to 800 μm. In an additional embodiment, the outer layer can be nonwoven, woven, knitted, crocheted, felted, or braided.

In one embodiment, the porous metallic film can comprise a metal selected from a group consisting of aluminum, silver, copper, nickel, gold, titanium, tungsten, molybdenum, and alloys thereof. In another embodiment, the porous metallic film can have a thickness in a range of 10 nm to 800 nm. In a further embodiment, the porous metallic film can comprise an interconnected-mesh structure.

In one embodiment, the outer layer can have an emissivity of infrared radiation at a wavelength of 9.5 μm on an outer surface of the polyolefin layer in a range of 5 percent to 60 percent.

In one embodiment, the inner layer can be nonwoven, woven, knitted, crocheted, felted, or braided. In another embodiment, the clothing fabric can have a water-vapor transmission-rate is at least 0.005 g/cm²/hour. In a further embodiment, the clothing fabric can have an opacity to visible light over a wavelength range of 400 nm to 700 nm of at least 40 percent.

Each feature or concept outlined above is independent and can be combined with the other features or concepts outlined above or with any other feature or concept disclosed in this application.

In an additional embodiment, a clothing fabric comprises an outer layer, an intermediate layer, and an inner layer. The outer layer can comprise a first porous metallic film on an inner surface of a first polyolefin layer. The first polyolefin layer can comprise a polyolefin fiber and particulate fillers dispersed within the polyolefin fiber. In addition, the first polyolefin layer can have a transmittance of infrared radiation at a wavelength of 9.5 μm of at least 38 percent. The first porous metallic film can have a reflectivity of infrared radiation at a wavelength of 9.5 μm of at least 40 percent.

The intermediate layer can be coupled to an inner surface of the first porous metallic film, and can comprise a fabric selected from a group consisting of cotton, polyester, silk, wool, down, rayon, linen, nylon, hemp, and mixtures thereof.

The inner layer can comprise a second porous metallic film on an outer surface of a second polyolefin layer. The second porous metallic film can be further coupled to an inner surface of the intermediate layer, and can have a reflectivity of infrared radiation at a wavelength of 9.5 μm of at least 40 percent. The second polyolefin layer can comprise a polyolefin fiber and particulate fillers dispersed within the polyolefin fiber. In addition, the second polyolefin layer can have a transmittance of infrared radiation at a wavelength of 9.5 μm of at least 38 percent.

In one embodiment, the particulate fillers in each of the outer and inner layers have an average particle size in a range of 10 nm to 4,000 nm. In another embodiment, a weight percentage of the particulate fillers within the polyolefin fiber in each of the outer and inner layers can be at least 0.10 percent. In a further embodiment, the particulate fillers within the polyolefin fiber in each of the outer and inner layers can comprise at least one of a metalloid, a metal oxide, a metal halide, a metal sulfide, or a metal cyanide. In an additional embodiment, the particulate fillers within the polyolefin fiber in each of the outer and inner layers can comprise at least one of zinc oxide, ferric ferrocyanide, iron oxide, or silicon. In yet another embodiment, each of the first polyolefin layer and the second polyolefin layer can have a thickness in a range of 50 μm to 800 μm. In one embodiment, each of the first polyolefin layer and the second polyolefin layer can be nonwoven, woven, knitted, crocheted, felted, or braided. In another embodiment, the particulate fillers in each of the outer and inner layers reflect at least one visible color selected from the group consisting of red, orange, yellow, green, blue, purple, black, and white.

In one embodiment, each of the first and second porous metallic films can comprise a metal selected from a group consisting of aluminum, silver, copper, nickel, gold, titanium, tungsten, molybdenum, and alloys thereof. In another embodiment, each of the first and second porous metallic films can have a thickness in a range of 10 nm to 800 nm. In a further embodiment, the average pore size of each of the first and second porous metallic films can be in a range of 50 nm to 300 nm. In yet another embodiment, each of the first and second porous metallic films can comprise an interconnected-mesh structure.

In one embodiment, the outer layer can have an emissivity of infrared radiation at a wavelength of 9.5 μm on an outer surface of the first polyolefin layer in a range of 5 percent to 60 percent.

In one embodiment, the intermediate layer can be nonwoven, woven, knitted, crocheted, felted, or braided. In another embodiment, the clothing fabric can have a water-vapor transmission-rate is at least 0.005 g/cm²/hour. In a further embodiment, the clothing fabric can have an opacity to visible light over a wavelength range of 400 nm to 700 nm of at least 40 percent.

Each feature or concept outlined above is independent and can be combined with the other features or concepts outlined above or with any other feature or concept disclosed in this application. Other features and advantages of the disclosure should become apparent from the following description of the preferred embodiments, taken in conjunction with the accompanying drawings, which illustrate, by way of example, the principles of the disclosure.

DETAILED DESCRIPTION

Controlling the infrared property of clothing fabrics can show strong effects on localized cooling and heating of the human body. For example, infrared-transparent nanoporous polyethylene ("nanoPE") can passively cool a body by about 2 degrees Celsius, and metallized nanoPE with low infrared emissivity can warm the body by about 7 degrees Celsius. This is because human skin has high emissivity and acts like a black body that strongly emits thermal radiation in the infrared wavelength range of 7 μm to 14 μm, with a peak intensity at 9.5 μm. Therefore, thermal radiation plays a large role in human body heat-dissipation, accounting for more than fifty percent in indoor conditions.

Based on the thermal radiation relation $\varepsilon=1-\rho-\tau$ (where $\varepsilon$, $\rho$, and $\tau$ are emissivity, reflectivity, and transmissivity, respectively), some clothing fabrics of this disclosure comprise an infrared-reflective metallic film and an infrared-transparent polyolefin layer. By constructing an infrared-reflective layer on an infrared-transparent layer, the spectrally-selective clothing fabric can achieve minimal emissivity on an outer surface and effectively suppress heat radiation loss without sacrificing comfort. This enables a 7 degree Celsius decrease of the temperature set-point compared to normal textiles, and outperforms other radiative heating textiles by more than 3 degrees Celsius. This large set-point expansion can save more than 35 percent of building heating energy in a cost-effective way.

However, it has been difficult to control the visible color appearance of such spectrally-selective textiles. Because color is an important factor in the wearable market, this dilemma has limited the practical application of these textiles. Commonly used organic dye-molecules have different types of chemical bonds, which can strongly absorb human body radiation, e.g., C—O stretching (7.7-10 μm), C—N stretching (8.2-9.8 μm), aromatic C—H bending (7.8-14.5 μm), and S=O stretching (9.4-9.8 μm). Thus, organic dyes can reduce infrared transparency, making them unsuitable for radiative cooling effects. Furthermore, polyethylene is chemically inert and lacks polar groups, which inhibits surface adhesion of chemical dyes.

Embodiments of this disclosure overcome this dilemma between visible and infrared property-control by incorporating inorganic nanoparticles into a polyolefin matrix to form a uniform composite for stable coloration. The embedded inorganic nanoparticles reflect certain visible colors while having negligible absorption in the infrared region.

Figure 1:
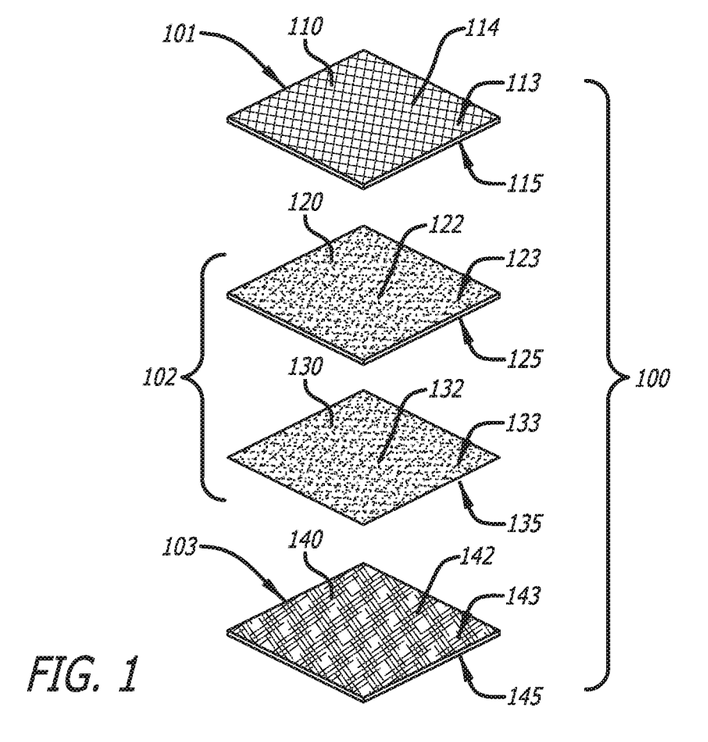
FIG. 1 is cross-sectional view of a clothing fabric in accordance with one embodiment.

With reference now to FIG. 1 of the illustrative drawings, there is shown a clothing fabric 100 having an outer layer 101, an intermediate layer 102, and an inner layer 103. The outer layer 101 can comprise a polyolefin layer 110. The intermediate layer 102 can comprise a polyolefin membrane 120 coupled to an inner surface 115 of the outer layer 101, and a porous metallic film 130 coupled to an inner surface 125 of the polyolefin membrane 120. The inner layer 103 can comprise textile layer 140 comprising a fabric 142. The inner layer 103 can be coupled to an inner surface 135 of the porous metallic film 130.

In one embodiment, the intermediate layer 102 can be formed by depositing the porous metallic film 130 onto the porous polyolefin membrane 120 through physical vapor deposition methods such as electro-beam physical vapor deposition or sputtering deposition. The outer layer 101 then can be laminated onto an outer surface 123 of the polyolefin membrane 120, and the inner layer 103 can be laminated onto the inner surface 135 of the porous metallic film 130.

As is described in more detail below, the polyolefin membrane 120 can exhibit high transmittance of infrared radiation while the porous metallic film 130 can exhibit high reflectivity of infrared radiation. As a result, the intermediate layer 102 can have a low emissivity of infrared radiation on the outer surface 123 of the porous polyolefin membrane 120. For example, in one embodiment, the intermediate layer 102 can have an emissivity of infrared radiation at a wavelength of 9.5 μm on the outer surface 123 of the porous polyolefin membrane 120 in a range of 5 percent to 60 percent. In another embodiment, the intermediate layer 102 can have an emissivity of infrared radiation at a wavelength of 9.5 μm on the outer surface 123 of the porous polyolefin membrane 120 of about 5 percent, 10 percent, 15 percent, 20 percent, 25 percent, 30 percent, 35 percent, 40 percent, 45 percent, 50 percent, 55 percent, or 60 percent.

Surprisingly, these emissivity values are much lower than the emissivity values of a Mylar blanket (60.6%), an Omni-Heat textile (85.4%), or cotton (89.5%). The infrared emissivity on the plastic sheet of the Mylar blanket is much higher than on the polyolefin membrane 120 side of the intermediate layer 102—despite the comparable infrared reflectivity of the metallic coatings. This result illustrates the importance of having high infrared-transparency on an outer protection layer to retain the low infrared emissivity of the underlying metal layer.

In one embodiment, the clothing fabric 100 can have an opacity to visible light over a wavelength range of 400 nm to 700 nm of at least 40 percent, 50 percent, 55 percent, 60 percent, 65 percent, 70 percent, 75 percent, 80 percent, 85 percent, 90 percent, or 95 percent. In another embodiment, the clothing fabric 100 can have a water-vapor transmission-rate in a range of 0.005 g/cm$^2$ per hour to 0.015 g/cm$^2$ per hour.

Figure 2:
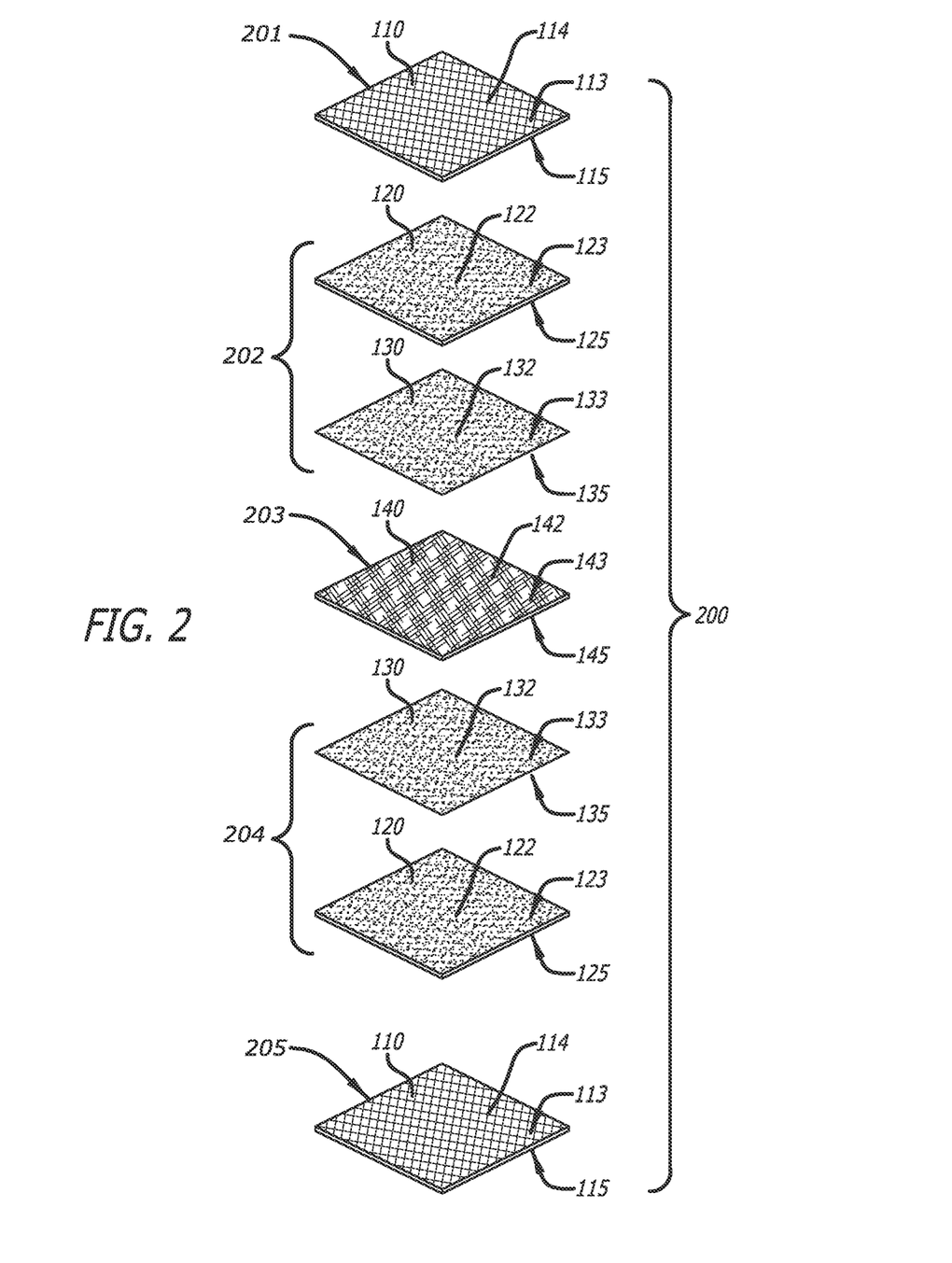
FIG. 2 is cross-sectional view of a clothing fabric in accordance with one embodiment.

With reference now to FIG. 2 of the illustrative drawings, there is shown a clothing fabric 200 having a first layer 201, a second layer 202, a third layer 203, a fourth layer 204, and a fifth layer 205. The first layer 201 and the fifth layer 205 can each comprise a polyolefin layer 110. The second layer 202 and the fourth layer 204 can each comprise a porous metallic film 130 on a surface of a polyolefin membrane 120. In the second layer 202, the porous polyolefin membrane 120 is coupled to an inner surface 115 of the first layer 201, and the porous metallic film 130 is on an inner surface 125 of the porous polyolefin membrane 120. In the fourth layer 204, the porous polyolefin membrane 120 is coupled to an outer surface 113 of the fifth layer 205, and the porous metallic film 130 is on an outer surface 123 of the porous polyolefin membrane 120. The third layer 203 can comprise textile layer 140 comprising a fabric 142. The third layer 203 can be coupled to an inner surface 135 of the porous metallic film 130 on the second layer 202 and to an outer surface 133 of the porous metallic film 130 on the fourth layer 204.

In one embodiment, the second layer 202 and the fourth layer 204 can each be formed by depositing a porous metallic film 130 onto a porous polyolefin membrane 120 through physical vapor deposition methods such as electro-beam physical vapor deposition or sputtering deposition. The first layer 201 then can be laminated onto the outer surface 123 of the porous polyolefin membrane 120 in the second layer 202, the third layer 203 can be laminated onto both the inner surface 135 of the porous metallic film 130 in the second layer 202 and the outer surface 133 of the porous metallic film 130 in the fourth layer 204, and the fifth layer 205 can be laminated onto the inner surface 125 of the porous polyolefin membrane 120 in the fourth layer 204.

As is described in more detail below, the polyolefin membrane 120 can exhibit high transmittance of infrared radiation while the porous metallic film 130 can exhibit high reflectivity of infrared radiation. As a result, the second layer 102 can have a low emissivity of infrared radiation on the outer surface 123 of the porous polyolefin membrane 120. For example, the second layer 202 can have an emissivity of infrared radiation at a wavelength of 9.5 μm on the outer surface 123 of the porous polyolefin membrane 120 in a range of 5 percent to 60 percent. In one embodiment, the second layer 202 can have an emissivity of infrared radiation at a wavelength of 9.5 μm on the outer surface 123 of the porous polyolefin membrane 120 of about 5 percent, 10 percent, 15 percent, 20 percent, 25 percent, 30 percent, 35 percent, 40 percent, 45 percent, 50 percent, 55 percent, or 60 percent.

In one embodiment, the clothing fabric 200 can have an opacity to visible light over a wavelength range of 400 nm to 700 nm of at least 40 percent, 50 percent, 55 percent, 60 percent, 65 percent, 70 percent, 75 percent, 80 percent, 85 percent, 90 percent, or 95 percent. In another embodiment, the clothing fabric 200 can have a water-vapor transmission-rate in a range of 0.005 g/cm$^2$ per hour to 0.015 g/cm$^2$ per hour.

Figure 3:
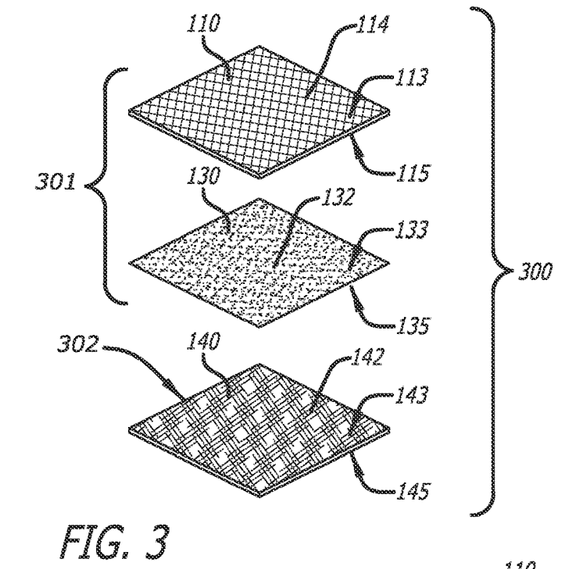
FIG. 3 is cross-sectional view of a clothing fabric in accordance with one embodiment.

With reference now to FIG. 3 of the illustrative drawings, there is shown a clothing fabric 300 having an outer layer 301 and an inner layer 302. The outer layer 301 can comprise a porous metallic film 130 coupled to an inner surface 115 of a polyolefin layer 110. The inner layer 302 can comprise textile layer 140 comprising a fabric 142. The inner layer 302 can be coupled to an inner surface 135 of the porous metallic film 130.

In one embodiment, the outer layer 301 can be formed by depositing the porous metallic film 130 onto the polyolefin layer 110 through physical vapor deposition methods such as electro-beam physical vapor deposition or sputtering deposition. The inner layer 302 then can be laminated onto the inner surface 135 of the of the porous metallic film 130.

As is described in more detail below, the polyolefin layer 110 can exhibit high transmittance of infrared radiation while the porous metallic film 130 can exhibit high reflectivity of infrared radiation. As a result, the outer layer 301 can have a low emissivity of infrared radiation on the outer surface 113 of the polyolefin layer 110. For example, the outer layer 301 can have an emissivity of infrared radiation at a wavelength of 9.5 μm on an outer surface 113 of the polyolefin layer 110 in a range of 5 percent to 60 percent. In one embodiment, the outer layer 301 can have an emissivity of infrared radiation at a wavelength of 9.5 μm on the outer surface 113 of the polyolefin layer 110 of about 5 percent, 10 percent, 15 percent, 20 percent, 25 percent, 30 percent, 35 percent, 40 percent, 45 percent, 50 percent, 55 percent, or 60 percent.

In one embodiment, the clothing fabric 300 can have an opacity to visible light over a wavelength range of 400 nm to 700 nm of at least 40 percent, 50 percent, 55 percent, 60 percent, 65 percent, 70 percent, 75 percent, 80 percent, 85 percent, 90 percent, or 95 percent. In another embodiment, the clothing fabric 300 can have a water-vapor transmission-rate in a range of 0.005 g/cm² per hour to 0.015 g/cm² per hour.

Figure 4:
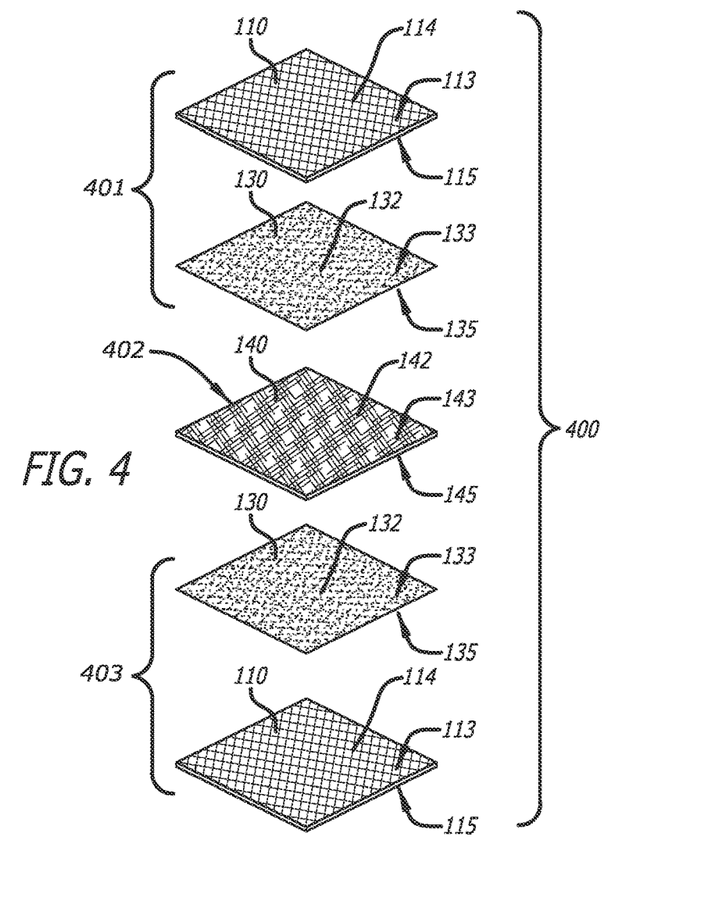
FIG. 4 is cross-sectional view of a clothing fabric in accordance with one embodiment.

With reference now to FIG. 4 of the illustrative drawings, there is shown a clothing fabric 400 having an outer layer 401, an intermediate layer 402, and an inner layer 403. The outer layer 401 and the inner layer 403 can each comprise a porous metallic film 130 on a surface of a polyolefin layer 110. In the outer layer 401, the porous metallic film 130 is on an inner surface 115 of the polyolefin layer 110. In the outer inner layer 403, porous metallic film 130 is on an outer surface 113 of the polyolefin layer 110. The intermediate layer 402 can comprise textile layer 140 comprising a fabric 142. The intermediate layer 402 can be coupled to an inner surface 135 of the porous metallic film 130 in the outer layer 401 and to an outer surface 133 of the porous metallic film 130 in the inner layer 403.

In one embodiment, the outer layer 401 and the inner layer 403 can each be formed by depositing the porous metallic film 130 onto the polyolefin layer 110 through physical vapor deposition methods such as electro-beam physical vapor deposition or sputtering deposition. The outer layer 401 then can be laminated onto an outer surface 143 of the intermediate layer 103, and the inner layer 403 can be laminated onto an inner surface 145 of the intermediate layer 103.

As is described in more detail below, the polyolefin layer 110 can exhibit high transmittance of infrared radiation while the porous metallic film 130 can exhibit high reflectivity of infrared radiation. As a result, the outer layer 401 can have a low emissivity of infrared radiation on the outer surface 113 of the polyolefin layer 110. For example, the outer layer 401 can have an emissivity of infrared radiation at a wavelength of 9.5 μm on the outer surface 113 of the polyolefin layer 110 in a range of 5 percent to 60 percent. In one embodiment, the outer layer 401 can have an emissivity of infrared radiation at a wavelength of 9.5 μm on the outer surface 113 of the polyolefin layer 110 of about 5 percent, 10 percent, 15 percent, 20 percent, 25 percent, 30 percent, 35 percent, 40 percent, 45 percent, 50 percent, 55 percent, or 60 percent.

In one embodiment, the clothing fabric 400 can have an opacity to visible light over a wavelength range of 400 nm to 700 nm of at least 40 percent, 50 percent, 55 percent, 60 percent, 65 percent, 70 percent, 75 percent, 80 percent, 85 percent, 90 percent, or 95 percent. In another embodiment, the clothing fabric 400 can have a water-vapor transmission-rate in a range of 0.005 g/cm² per hour to 0.015 g/cm² per hour.

The Polyolefin Layer 110

The clothing fabrics 100, 200, 300, and 400 illustrated by FIGS. 1-4 can include a polyolefin layer 110. In one embodiment, the polyolefin layer 110 can have a thickness in a range of 50 μm to 800 μm. In another embodiment, the polyolefin layer 110 can have a thickness in a range of about 50 μm to 500 μm, in a range of about 50 μm to 300 μm, or in a range of about 100 μm to 300 μm. In a further embodiment, the polyolefin layer 110 can have a thickness of about 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 510 μm, 520 μm, 530 μm, 540 μm, 550 μm, 560 μm, 570 μm, 580 μm, 590 μm, 600 μm, 610 μm, 620 μm, 630 μm, 640 μm, 650 μm, 660 μm, 670 μm, 680 μm, 690 μm, 700 μm, 710 μm, 720 μm, 730 μm, 740 μm, 750 μm, 760 μm, 770 μm, 780 μm, 790 μm, or 800 μm.

Figure 5:
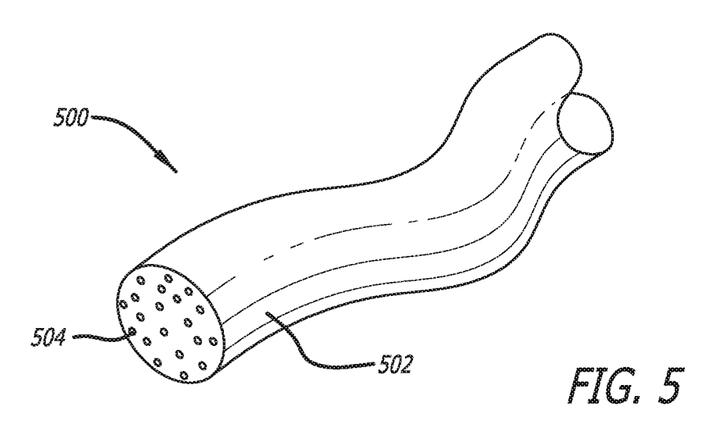
FIG. 5 is a perspective, cross-sectional view of a polyolefin fiber in accordance with one embodiment.

The polyolefin layer 110 can comprise a polyolefin fiber. FIG. 5 is a schematic showing a perspective, cross-sectional view of a polyolefin fiber 500 according to some embodiments of this disclosure. The fiber 500 includes an elongated member 502 and particulate fillers 504 dispersed within the elongated member 502.

The elongated member 502 can include a single polyolefin or a blend of two or more different polyolefins. To impart infrared transparency in some embodiments, a polyolefin or a blend of polyolefins having a low absorption of infrared radiation can be used. In such embodiments, suitable polyolefins include polyethylene, polypropylene, and other thermoplastic polyolefins or polyolefin elastomers. In the case of polyethylene, suitable molecular weights can range from low density polyethylene (LDPE), high density polyethylene (HDPE), and ultra-high molecular weight polyethylene (UHMWPE). Polyethylene can be blended or at least partially replaced with other polymers, such as polypropylene, polyvinyl chloride (PVC), vinylon, polyacrylonitrile (PAN), polyamide (e.g., nylon), polyethylene terephthalate (PET), polyester, polyvinyl fluoride (PVF), copolymers, other thermoplastic polymers, natural polymers, and so forth. For example, a blend of polyethylene and polypropylene (or more generally a blend of two or more different polyolefins) can be used to impart improved mechanical strength while maintaining infrared transparency, such as where a weight percentage of polypropylene relative to a combined weight of polyethylene and polypropylene is in a range of about 1 percent to about 60 percent, about 1 percent to about 50 percent, about 5 percent to about 45 percent, about 5 percent to about 40 percent, about 5 percent to about 35 percent, about 5 percent to about 30 percent, about 5 percent to about 25 percent, about 5 percent to about 20 percent, or about 10 percent.

In some embodiments, suitable polyolefins have a transmittance of infrared radiation at a wavelength of 9.5 μm of at least about 40 percent, at least about 50 percent, at least about 60 percent, at least about 70 percent, at least about 80 percent, at least about 90 percent, at least about 95 percent, or at least about 98 percent. In some embodiments, suitable polyolefins have a weighted average transmittance of infrared radiation over a wavelength range of 7-14 μm of at least about 30 percent, at least about 40 percent, at least about 50 percent, at least about 60 percent, at least about 70 percent, at least about 80 percent, at least about 90 percent, or at least about 95 percent.

As discussed above, it has been difficult to control the visible color appearance of such infrared-transparent textiles. Some embodiments overcome this challenge by incorporating into the polyolefin fiber 502 unique particulate fillers 504 that reflect certain visible colors while having negligible absorption in the infrared region.

In some embodiments, the particulate fillers 504 dispersed within the polyolefin can provide a contrast in refractive index relative to the polyolefin or the blend of polyolefins included in the textile to selectively scatter light in a desired spectrum. In particular, the particulate fillers 504 strongly scatter light in the desired spectrum, but have low scattering in the mid-infrared range. In some embodiments, the particulate fillers are sized and have a material composition to selectively scatter light in a solar irradiance spectrum in a range of about 300 nm to about 4 μm, encompassing radiation in the visible range of about 400 nm to about 700 nm and radiation in the near-infrared range of 700 nm to about 4 μm, thereby providing a cooling effect under direct sunlight. In other embodiments, the particulate fillers are sized and configured to have a material composition to selectively scatter certain wavelengths or colors in the visible range, thereby providing a coloration effect.

In some embodiments, a relative difference in refractive index between the particulate fillers 504 and the elongated member 502 is at least about ±1 percent with respect to a refractive index of the polyolefin or the blend of polyolefins included in the elongated member 502 (e.g., for visible light measured at 589 nm). In one embodiment, the relative difference in refractive index between the particulate fillers 504 and the elongated member 502 is as at least about ±5 percent, at least about ±8 percent, at least about ±10 percent, at least about ±15 percent, at least about ±20 percent, at least about ±25 percent, at least about ±30 percent, at least about ±35 percent, at least about ±40 percent, at least about ±45 percent, or at least about ±50 percent.

In some embodiments, an absolute difference in refractive index between the particulate fillers 504 and the elongated member 502 is at least about ±0.01 with respect to the refractive index of the polyolefin or the blend of polyolefins included in the elongated member 502 (e.g., for visible light measured at 589 nm). In one embodiment, the absolute difference in refractive index between the particulate fillers 504 and the elongated member 502 is as at least about ±0.05, at least about ±0.10, at least about ±0.15, at least about ±0.20, at least about ±0.25, at least about ±0.30, at least about ±0.35, at least about ±0.40, at least about ±0.45, at least about ±0.50, or at least about ±0.55. A refractive index of the particulate fillers 504 can be higher or lower than the refractive index of the polyolefin or the blend of polyolefins included in the elongated member 502.

In some embodiments, the particulate fillers 504 provide a contrast in refractive index due to a material of the fillers. The particulate fillers 504 dispersed within the polyolefin fiber 500 can be infrared-transparent inorganic pigments that show visible colors. Examples of suitable materials of fillers include inorganic materials that have a low absorption of radiation in a range of about 300 nm to about 20 μm, encompassing radiation in the visible range, radiation in the near-infrared range, and radiation in the mid-infrared range, such as metalloids (e.g., silicon), metal oxides (e.g., zinc oxide and iron oxide), metalloid oxides (e.g., silicon oxide), metal halides (e.g., potassium bromide, cesium iodide, potassium chloride, and sodium chloride), metal sulfides (e.g., zinc sulfide), metal cyanides (e.g., Prussian blue), and so forth. For example, the particulate fillers 504 can comprise zinc oxide (which can add a white color), ferric ferrocyanide or "Prussian blue" (which can add a blue color), iron oxide (which can add a red color) silicon (which can add a black or yellow color), or combinations thereof.

These inorganic solids have negligible absorbance in the infrared wavelength region of 4 μm to 14 μm, except in the intense and narrow peak of Prussion blue at 4.8 μm due to the C≡N stretching vibration and a weak and broad peak of silicon around 8 μm to 10 μm due to the native silicone oxide on the surface. In some embodiments, suitable materials for the fillers have a transmittance of infrared radiation at a wavelength of 9.5 μm of at least about 30 percent, at least about 40 percent, at least about 50 percent, at least about 60 percent, at least about 70 percent, at least about 80 percent, at least about 90 percent, at least about 95 percent, or up to about 98 percent. In some embodiments, suitable materials for the fillers have a weighted average transmittance of infrared radiation over a wavelength range of 7-14 μm of at least about 30 percent, at least about 40 percent, at least about 50 percent, at least about 60 percent, at least about 70 percent, at least about 80 percent, at least about 90 percent, or up to about 95 percent.

The fillers are sized to primarily scatter radiation in the visible range and the near-infrared range instead of radiation in the mid-infrared range. For example, the fillers can be nano-sized (e.g., as nanoparticles) and have a size comparable to wavelengths of visible light and below wavelengths of mid-infrared radiation. In some embodiments, the fillers have an average or peak particle size in a range of about 10 nm to about 4,000 nm, about 20 nm to about 1,000 nm, about 50 nm to about 1,000 nm, about 50 nm to about 900 nm, about 50 nm to about 800 nm, about 50 nm to about 700 nm, about 50 nm to about 600 nm, about 50 nm to about 500 nm, about 50 nm to about 400 nm, about 100 nm to about 400 nm, or about 500 nm to about 1,000 nm.

On one hand, this nanoscale size-range is much smaller than the human body thermal radiation wavelengths of 4-14 μm. Hence, these nanoparticles will not induce strong scattering of infrared light to decrease the infrared transparency of the colored polyolefin mixtures. On the other hand, high refractive index dielectric or semiconductor nanoparticles in a particular size range can have strong resonant light scattering in the visible spectral range on the basis of Mie theory. Therefore, different visible colors can be produced by controlling the nanoscale dimensions.

For example, in contrast to the black color of bulk silicon, silicon nanoparticles (refractive index >3.8 at 633 nm) with diameters of 100 nm to 200 nm exhibit a yellow color, which results from pronounced Mie resonance responses associated with the excitation of both magnetic and electric dipole modes. Different from silicon nanoparticles, both Prussian blue and iron oxide nanoparticles show their natural color as bulk. The intense blue color of Prussian blue is associated with the intervalence charge transfer between Fe(II) to Fe(III), while the dark red color of iron oxide is determined by its optical band gap of ~2.2 eV. With these three primary colors of blue, red, and yellow, all different colors over the visible spectrum can be created by mixing them at different ratios.

In some embodiments, a distribution of particle sizes can be controlled to impart a desired coloration to the fiber 500 (and a resulting woven textile). For example, the fillers can be relatively uniform in size, such as where a standard deviation of particle sizes is no greater than about 50 percent, no greater than about 45 percent, no greater than about 40 percent, no greater than about 35 percent, no greater than about 30 percent, no greater than about 25 percent, or no greater than about 20 percent of a mean particle size. In some embodiments, a weight percentage of the fillers within the elongated member 502 is at least about 0.10 percent, at least about 10 percent, at least about 15 percent, at least about 20 percent, at least about 25 percent, at least about 30 percent, at least about 35 percent, at least about 40 percent, at least about 45 percent, or at least about 0.50 percent. In some embodiments, a number density of the fillers within the textile is at least about 0.1 μm$^3$, at least about 0.5 μm$^3$, at least about 1 μm$^3$, at least about 2 μm$^3$, at least about 4 μm$^3$, at least about 6 μm$^3$, or at least about 8 μm$^3$. The fillers can be regularly or irregularly shaped, and can have aspect ratios of about 3 or less, or greater than about 3.

In some embodiments, the elongated member 502 can further comprise pores. Pores of the textile can be sized to contribute to selective scattering of light in a desired spectrum, in conjunction with fillers. For example, the pores can be nano-sized (e.g., as nanopores) so as to be comparable to wavelengths of visible light and below wavelengths of mid-infrared radiation. In some embodiments, the pores have an average or peak pore size in a range of about 10 nm to about 4,000 nm, about 10 nm to about 2,000 nm, about 10 nm to about 1,000 nm, about 10 nm to about 900 nm, about 10 nm to about 800 nm, about 10 nm to about 700 nm, about 10 nm to about 600 nm, about 10 nm to about 500 nm, about 10 nm to about 40 nm, or about 10 nm to about 300 nm. In some embodiments, a distribution of pore sizes can be controlled to impart a desired wavelengths of scattered radiation. For example, the pores can be relatively uniform in size, such as where a standard deviation of pore sizes is no greater than about 50 percent, no greater than about 45 percent, no greater than about 40 percent, no greater than about 35 percent, no greater than about 30 percent, no greater than about 25 percent, or no greater than about 20 percent of a mean pore size. A pore size can be determined using, for example, the Barret-Joyner-Halenda model. In some embodiments, a volume percentage of the pores within the elongated member 502 is at least about 5 percent, at least about 10 percent, at least about 15 percent, at least about 20 percent, at least about 25 percent, at least about 30 percent, at least about 35 percent, or at least about 40 percent, at least about 50 percent, at least about 60 percent, or at least about 70 percent. In some embodiments, at least some of the pores can be interconnected to increase air permeability and increase conduction and convection heat dissipation through the interconnected pores. The pores can be regularly or irregularly shaped, and can have aspect ratios of about 3 or less, or greater than about 3.

During formation of the fiber 500, one or more additives can be included, such as anti-oxidants, anti-microbials, colorants or dyes, water wicking agents (e.g., cotton), metals, wood, silk, wool, and so forth. The one or more additives can be dispersed within a polyolefin or a blend of polyolefins included in the elongated member 502.

While FIG. 5 illustrates the fiber 500 with a circular cross-sectional shape, fibers with a variety of other regular or irregular cross-sectional shapes are contemplated, such as multi-lobal, octagonal, oval, pentagonal, rectangular, square-shaped, trapezoidal, triangular, wedge-shaped, and so forth. A surface of the fiber 500 can be chemically or physically modified to impart additional properties, such as hydrophilicity, anti-microbial property, coloration, texturing, and so forth. For example, although not shown in FIG. 5, a coating can be applied over the surface of the fiber 500 to impart hydrophilicity, such as a coating of polydopamine (PDA) as a hydrophilic agent.

Other embodiments of a polyolefin fiber 500 are contemplated. In some embodiments, a polyolefin fiber includes multiple (e.g., two or more) elongated members that are joined or otherwise combined to form an unitary body of the fiber. At least one of the elongated members includes particulate fillers 504 dispersed therein, and the elongated members can include the same polyolefin (or the same blend of polyolefins) or different polymers (or different blends of polymers). The elongated members can be arranged in a variety of configurations. For example, the elongated members can be arranged in a core-sheath configuration, an island-in-sea configuration, a matrix or checkerboard configuration, a segmented-pie configuration, a side-by-side configuration, a striped configuration, and so forth. Further embodiments of a polyolefin fiber can be realized so as to have a hollow structure, a block structure, a grafted structure, and so forth.

In some embodiments, the polyolefin fiber can comprise a polyolefin having particulate fillers (e.g., infrared-transparent inorganic nanoparticles) dispersed therein. These two components can be uniformly mixed via a compounding process, and the formed composites can then be extruded into a fiber shape for weaving or knitting of the interlaced fabric. In some embodiments, a polyolefin fiber can formed by a process of extrusion and solvent extraction. In particular, a polyolefin or a blend of polyolefins can be dissolved in a solvent, such as paraffin oil, to form a mixture. A volume percentage of the solvent in the mixture can be selected to obtain a desired volume percentage of pores within a resulting fiber after solvent extraction. In place of, or in combination with, paraffin oil, other suitable liquid solvents or solids can be used, such as solid wax, mineral oil, and so forth. The mixture can then be extruded through an extrusion device (e.g., a spinneret or a syringe) to form a polyolefin fiber including the solvent dispersed in the fiber, and the solvent is extracted to leave nanopores in the polyolefin fiber. Extraction of the solvent can be performed by immersion in a chemical bath of an extraction agent, such as methylene chloride, although other manners of extraction are contemplated, such as evaporation.

Once formed, polyolefin fibers of some embodiments can be subjected to a variety of processes to form a woven textile, either as individual fibers or as included in a multi-fiber yarn. Examples include weaving, knitting, felting, braiding, plaiting, and so forth. Depending on the process used, a variety of woven structures can be attained, including weaving patterns such as plain, basket, twill, satin, herringbone, and houndstooth, and knitting patterns such as Jersey, Rib, Purl, Interlock, Tricot, and Raschel. Polyolefin fibers of some embodiments can be subjected to weaving in combination with other fibers (e.g., other fibers formed of a thermoplastic polymer or a natural polymer) to form a woven textile.

A resulting infrared-transparent woven textile of some embodiments (e.g., the polyolefin layer 110) can exhibit various benefits. In some embodiments, the polyolefin layer has a transmittance of infrared radiation at a wavelength of 9.5 μm of at least about 30 percent, at least about 40 percent, at least about 50 percent, at least about 60 percent, at least about 70 percent, at least about 80 percent, at least about 90 percent, at least about 95 percent, or up to about 98 percent. In some embodiments, the textile has a weighted average transmittance of infrared radiation over a wavelength range of 7-14 μm of at least about 30 percent, at least about 40 percent, at least about 50 percent, at least about 60 percent, at least about 70 percent, at least about 80 percent, at least about 90 percent, or up to about 95 percent. In some embodiments, the textile has an opacity (expressed as a percentage as [100−transmittance]) to visible light over a wavelength range of 400-700 nm of at least about 30 percent, at least about 40 percent, at least about 50 percent, at least about 60 percent, at least about 70 percent, at least about 80 percent, at least about 90 percent, at least about 95 percent, or up to about 99 percent. In some embodiments, the textile has a water-vapor transmission-rate of at least about 0.005 g/cm$^2$ per hour, at least about 0.008 g/cm$^2$ per hour, at least about 0.01 g/cm$^2$ per hour, at least about 0.012 g/cm$^2$ per hour, at least about 0.014 g/cm$^2$ per hour, at least about 0.016 g/cm$^2$ per hour, or up to about 0.02 g/cm$^2$ per hour. In some embodiments, the textile has an air permeability of at least about 10 cm$^3$/s/cm$^2$, at least about 20 cm$^3$/s/cm$^2$, at least about 30 cm$^3$/s/cm$^2$, at least about 40 cm$^3$/s/cm$^2$, at least about 50 cm$^3$/s/cm$^2$, at least about 60 cm$^3$/s/cm$^2$, or up to about 80 cm$^3$/s/cm$^2$. In some embodiments, the textile has a tensile strength of at least about 10

N, at least about 20 N, at least about 30 N, at least about 40 N, at least about 50 N, or up to about 60 N.

As illustrated by FIGS. 1-4, an infrared-transparent woven textile of some embodiments (e.g., the polyolefin layer 110) can be incorporated into a clothing fabric (e.g., 100, 200, 300, 400), either as a single layer in a single-layered cloth, or among multiple (e.g., two or more) layers of a multi-layered cloth. In the case of a multi-layered cloth, an infrared-transparent woven textile can be laminated or otherwise combined with one or more additional layers, such as one or more layers of other textile materials (e.g., cotton or polyester). A resulting cloth can be used in a variety of articles of clothing, such as apparel and footwear, as well as other products, such as medical products.

The Porous Polyolefin Membrane 120

The clothing fabrics 100 and 200 illustrated by FIGS. 1 and 2 can include a porous polyolefin membrane 120 comprising a polyolefin such as polyethylene, polypropylene, or combinations thereof. The porous polyolefin membrane 120 can support and cover an outer surface of the porous metallic film 130 described below.

In one embodiment, the porous polyolefin membrane 120 can have a thickness in a range of 5 µm to 500 µm, 5 µm to 400 µm, 5 µm to 300 µm, 5 µm to 200 µm, 5 µm to 100 µm, 5 µm to 90 µm, 5 µm to 80 µm, 5 µm to 70 µm, 5 µm to 60 µm, 5 µm to 50 µm, 5 µm to 40 µm, 5 µm to 30 µm, 5 µm to 20 µm, 10 µm to 15 µm, 10 µm to 20 µm, 10 µm to 25 µm, 10 µm to 30 µm, 10 µm to 35 µm, or 10 µm to 40 µm.

In one embodiment, the porous polyolefin membrane 120 can have a transmittance of infrared radiation at a wavelength of 9.5 µm of at least 38 percent, at least 40 percent, at least 50 percent, at least 55 percent, at least 60 percent, at least 65 percent, at least 70 percent, at least 75 percent, at least 80 percent, at least 85 percent, at least 90 percent, or at least 95 percent.

In one embodiment, the porous polyolefin membrane 120 can have pores 122 having an average pore size in a range of 10 nm to 4,000 nm, 50 nm to 1,000 nm, 50 nm to 900 nm, 50 nm to 800 nm, 50 nm to 700 nm, 50 nm to 600 nm, 50 nm to 500 nm, 50 nm to 400 nm, 50 nm to 300 nm, 50 nm to 200 nm, or 50 nm to 100 nm. The pores in the porous polyolefin membrane 120 permit air permeability. In addition, pores having an average pore size in a range of about 400 nm to about 700 nm can scatter visible light and make the layer opaque to human eyes. While the pore sizes can be much smaller than the infrared wavelength (~9 µm), the porous polyolefin membrane 120 remains highly transparent to infrared.

A volume percentage of the pores 122 within the porous polyolefin membrane 120 can be at least about 5 percent, at least 10 percent, at least 15 percent, at least 20 percent, at least 25 percent, at least 30 percent, at least 35 percent, at least 40 percent, at least 45 percent, at least 50 percent, at least 55 percent, at least 60 percent, at least 65 percent, at least 70 percent, or at least 75 percent.

The Porous Metallic Film 130

The clothing fabrics 100, 200, 300, and 400 illustrated by FIGS. 1-4 can include a porous metallic film 130 comprising a metal selected from a group consisting of aluminum, silver, copper, nickel, gold, titanium, tungsten, molybdenum, and alloys thereof. In one embodiment, the porous metallic film 130 can comprise a bi-layer or a tri-layer of different combinations of metals.

In one embodiment, the porous metallic film 130 can have a thickness in a range of 10 nm to 800 nm, 10 nm to 700 nm, 10 nm to 600 nm, 10 nm to 500 nm, 50 nm to 100 nm, 50 nm to 200 nm, 50 nm to 300 nm, 50 nm to 400 nm, 100 nm to 200 nm, 100 nm to 300 nm, 100 nm to 400 nm, or 100 nm to 500 nm.

The porous metallic film 130 can have a reflectivity of infrared radiation at a wavelength of 9.5 µm of at least 40 percent, 50 percent, 55 percent, 60 percent, 65 percent, 70 percent, 75 percent, 80 percent, 85 percent, 90 percent, or 95 percent.

To maintain the desired reflectivity while providing breathability, the porous metallic film 130 can have pores 132 that are smaller than the infrared wavelength but larger than a water molecule. This overcomes a limitation of other radiative heating textiles, where the metallic coating is either too dense to be breathable (e.g., Mylar blanket) or too sparse to be highly reflective (e.g., Omni-Heat). In one embodiment, the porous metallic film 130 can have pores 132 having an average pore size in a range of 10 nm to 4,000 nm, 50 nm to 1,000 nm, 50 nm to 900 nm, 50 nm to 800 nm, 50 nm to 700 nm, 50 nm to 600 nm, 50 nm to 500 nm, 50 nm to 400 nm, 50 nm to 300 nm, 50 nm to 200 nm, or 50 nm to 100 nm.

The structure of the porous metallic film can also impact reflectivity and breathability. For example, porous metallic films having pore sizes in the ranges described above might exhibit reflectivity below the desired range if the film is in the form of isolated islands. However, porous metallic films in the form of an interconnected mesh have far higher reflectivity than films in the form of isolated islands with the same coverage density. Therefore, in some embodiments, the porous metallic film 130 is in an interconnected porous mesh, which can provide optimal reflectivity and breathability.

In some embodiments (e.g. the embodiments shown in FIGS. 1 and 2), the porous metallic film 130 can be added to the inner surface 125 of the porous polyolefin membrane 120. In other embodiments (e.g., the embodiments shown in FIGS. 3 and 4), the porous metallic film 130 can be added to the inner surface 115 of the polyolefin layer 110. In either case, the porous metallic film 130 can be deposited through physical vapor deposition methods, such as electro-beam physical vapor deposition or sputtering deposition.

The Textile Layer 140

The clothing fabrics 100, 200, 300, and 400 illustrated by FIGS. 1-4 can include a textile layer 140 comprising a fabric 142 selected from a group consisting of cotton, polyester, silk, wool, down, rayon, linen, nylon, hemp, and mixtures thereof. In one embodiment, the textile layer 142 can be nonwoven, woven, knitted, crocheted, felted, or braided. This textile layer 140 can enhance the mechanical strength of the clothing fabric, and maintain wearing comfort and insulation against thermal conduction.

It should be appreciated from the foregoing description that the present disclosure provides improved spectrally-selective clothing-fabrics that not only regulate heat-dissipation for effective human body cooling and warming, but that also provide comfort and durability, without compromising color variability and attractiveness.

Specific methods, devices, and materials are described, although any methods and materials similar or equivalent to those described can be used in the practice or testing of the present embodiment. Unless defined otherwise, all technical and scientific terms used herein have the same meanings as commonly understood by one of ordinary skill in the art to which this embodiment belongs.

The terms "a," "an," and "at least one" encompass one or more of the specified element. That is, if two of a particular element are present, one of these elements is also present and thus "an" element is present. The terms "a plurality of" and "plural" mean two or more of the specified element. The term "or" used between the last two of a list of elements means any one or more of the listed elements. For example, the phrase "A, B, or C" means "A, B, and/or C," which means "A," "B," "C," "A and B," "A and C," "B and C," or "A, B, and C." The term "coupled" generally means physically coupled or linked and does not exclude the presence of intermediate elements between the coupled items absent specific contrary language.

Without further elaboration, it is believed that one skilled in the art, using the proceeding description, can make and use the present invention to the fullest extent. Other objectives, features, and advantages of the present embodiments will become apparent from the following specific examples. The specific examples, while indicating specific embodiments, are provided by way of illustration only. Accordingly, the present invention also includes those various changes and modifications within the spirit and scope of the invention that may become apparent to those skilled in the art from this detailed description. The following examples are illustrative only, and are not limiting of the disclosure in any way whatsoever.

EXAMPLES

Example 1: Spectrally-Selective Clothing Fabric Having an Inorganic-Organic Matrix A combination of material property and structural photonic engineering was used to develop a clothing fabric with a selective spectral response by embedding zinc oxide (ZnO) nanoparticles into nanoporous polyethylene (PE).

It was experimentally shown that the ZnO-PE layer can allow a skin-simulating heater with a heat generation rate of about 104 W/m$^2$ (comparable to that of human skin) to avoid overheating by more than about 10° C. This corresponds to a cooling power of more than about 200 W/m$^2$ compared to a normal textile like cotton under typical outdoor environment with peak solar irradiance over about 900 W/m$^2$. Furthermore, when sweat evaporation comes into play, the radiative cooling textile can avoid overheating of the skin-simulating heat by up to about 8° C. compared to cotton. These results demonstrate the superior capability of selectively tailoring textile radiation property for passive outdoor cooling.

At a skin temperature of about 34° C., the human body emits thermal radiation mainly in the mid-infrared range between about 7 to 14 μm (with the peak emission at the wavelength of about 9.5 μm) and a net radiation power-density of about 100 W/m$^2$. A typical textile like cotton (white) has an averaged solar reflectivity of about 60%, allowing a large portion of the solar irradiance power to be absorbed by the skin. At the same time, the low infrared-transmissivity of cotton impedes efficient dissipation of human body thermal radiation.

In contrast, because of the marginal overlap between the solar irradiance and human body thermal radiation spectra, a spectrally-selective radiation textile (having strong solar reflection and high mid-infrared transmission) can simultaneously reduce input and enhance output of radiative transfer for outdoor cooling.

Polyethylene, having aliphatic CC and CH bonds, is infrared-transparent, and can substantially fully transmit human body radiation for indoor cooling. Its solar reflectance is not satisfactory for outdoor purposes, however, due to its relatively low refractive index of about 1.5. Inorganic solids typically have higher refractive indexes than polymers. For example, zinc oxide has a refractive index of about 2 and also has little absorption from visible wavelengths (about 400 nm) up to mid-infrared wavelengths (about 16 μm). Their material properties render the combination of zinc oxide (ZnO) and polyethylene (PE) suitable as a base material for constructing a desired radiation selectivity for outdoor cooling purposes.

Numerical optimization was performed for the inorganic-organic matrix design using structural photonic engineering to derive the spectrally selective radiation property. At particle sizes below 0.1 μm or above 1 μm, the scattering cross-sections of the spherical zinc oxide were either all small or all large over the entire wavelength range, resulting in low selectivity over the spectrum. At particle sizes between 0.1 μm and 1 μm (which is comparable to the range of wavelengths of solar light) strong Mie scatter occurred, which significantly increased the scattering in the visible and near-infrared ranges, while scattering in the mid-infrared ranges remained small. This result indicates that proper selection of zinc oxide particle size within about 0.1 μm to about 1 μm provides high reflection in visible and near-infrared and high transmission in mid-infrared. In addition, detailed calculations were performed to determine the effects of zinc oxide particle size and density on the solar reflection and mid-infrared transmission. With an increase of particle size and density, the solar reflection increased while the mid-infrared transmission decreased, revealing an optimized region.

Given the guidance from numerical optimization, a nanoporous ZnO/PE textile was fabricated by mixing zinc oxide particles with melted polyethylene at a weight ratio of ZnO:PE=about 2:5 in paraffin oil (the ratio of PE to oil was about 1 to 5), then melt-pressing the composite mixture into a thin film, and extracting the paraffin oil from the film with methylene chloride. The resulting ZnO/PE film had a white color under the sun, indicating strong scattering of all visible light from all angles. Examination under scanning electron microscopy revealed the porous structure of the textile (a pore occupation volume is about 20 percent to about 30 percent) with ZnO particles randomly embedded in the polyethylene matrix. X-ray computed tomographic scanning of the textile sample using an x-ray microscope showed a uniform distribution of zinc oxide particles within the whole volume. Particle diameters where characterized (using dynamic light scattering) and found to be mainly between about 0.3 μm and 0.8 μm with a peak at about 0.5 μm, matching the numerically optimized particle size.

The infrared reflectivity (ρ) and transmissivity (τ) of the ZnO/PE textile were measured using a FTIR spectrometer (Thermo Scientific Model 6700) accompanied with a diffuse gold integrating sphere (PIKE technologies). The infrared emissivity (ε) was then calculated using the equation ε=100%−ρ−τ. The measured spectra showed high reflectivity of more than about 90 percent in the solar light region and high transmissivity of about 80 percent between about 7 and 14 μm where the human body thermal radiation is centralized. Thus, the ZnO/PE composite had low thermal emissivity (a high thermal transmissivity instead) and strong solar reflectivity. The visible opacity was measured by a UV-visible spectrometer (Agilent, Cary 6000i).

The outdoor performance of the ZnO/PE textile was tested using a skin-simulating heater. The measurement setup included the skin-simulating heater, a thermocouple on the heater surface to measure the simulated skin temperature, and a textile sample covering the simulated skin. The heater was placed on top of foam to prevent heat loss to the bottom. A heating power input of about 104 W/m² was applied to the heater to simulate the metabolic heat generation rate of the skin. The real-time temperature of the skin-simulating heater was recorded for about four hours, while the entire setup was under direct sunlight and exposed to the air. Under wind convection and peak solar irradiance of about 910 W/m², the ZnO/PE-covered skin-simulating heater displayed a temperature of about 33.5° C.—much lower than that of a bare skin-simulating heater (53.1° C.) or than that of a skin-simulating heater covered by white cotton (45.6° C.). Indeed, the temperatures of the skin-simulating heaters without the textile samples were the same under both sunlight and shade, confirming that the measured temperature differences came from the effect of the textiles. The notably lower temperature for the ZnO/PE-covered skin-simulating heater illustrates the superior cooling power of the ZnO/PE textile. The improved cooling power is produced by its high solar reflection, which reduces heat input from the sun, as well as its high transmission of human body thermal radiation, which enhances radiative heat output. Using heat transfer model analysis, the additional cooling power demands of the textile samples to achieve a skin temperature of about 34° C. were calculated. The cotton-covered skin-simulating heater exhibited an additional cooling power of about 116 W/m² to about 219 W/m², while the bare skin-simulating heater exhibited an additional cooling power of about 305 W/m² to about 454 W/m². Meanwhile, the ZnO/PE textile passively cooled the skin-simulating heater to maintain temperature slightly below 34° C. without additional cooling power supply.

Moreover, the cooling power of evaporation did not make up for this difference. Real-time outdoor measurements were performed under wind convection and solar irradiance of about 900 W/m² to about 1050 W/m² with a water-soaked porous layer on top of the heater to take the sweat evaporation into account. With the addition of the sweat evaporation effect, the ZnO/PE textile maintained the temperature of the skin-simulating heater about 34° C., while the cotton-covered and bare skin-simulating heaters were observed to overheat by about 5° C. to about 8° C. and about 9° C. to about 15° C., respectively.

Example 2: Spectrally-Selective Clothing Fabric Having Metallized Polyethylene and Cotton A clothing fabric was fabricated by plating a porous aluminum film onto a porous polyethylene membrane and then laminating the metallized polyethylene membrane (PE/Al) with knitted or woven cotton (PE/Al/cotton).

The outdoor performance of the PE/Al/cotton-clothing fabric was tested using a skin-simulating heater. For the tests, skin was simulated by a heater (Omega, 72 cm²) connected to a power supply (Keithley 2400). A ribbon-type hot-junction thermocouple (Omega, 0.3 mm diameter, K-type,) was in contact with a top surface of the simulated skin to measure skin temperature. A guard heater and an insulating foam were placed below the simulated skin heater to ensure that the heat generated by the skin heater transferred to the environment. To avoid downward heat conduction to the table, the temperature of the guard heater was set the same as the skin heater. The entire device was enclosed in a chamber, and the ambient temperature inside the chamber was controlled.

The power density of the skin heater was set to 73 W/m², which produced a skin temperature of 33.5° C. at an ambient temperature of 25° C. When the skin was covered by the textile samples (5 cm×7 cm), we measured the steady-state ambient temperature that was needed to maintain the skin temperature at 33.5±0.1° C.

These measurements confirmed the good warming performance of the PE/Al layer. Both a woven PE/Al/cotton sample and a knitted PE/Al/cotton sample showed superior warming performance to woven and knitted cotton samples. More specifically, the woven PE/Al/cotton fabric was able to maintain the 33.5° C. skin temperature with an ambient temperature of 11.1° C., which was 7.2° C. lower than the ambient temperature required to maintain the same skin temperature when the skin heater was covered by the woven cotton sample. Similarly, the knitted PE/Al/cotton fabric was able to maintain the 33.5° C. skin temperature with an ambient temperature of 10.5° C., which was 8.5° C. lower than the ambient temperature required to maintain the same skin temperature when the skin heater was covered by the knitted cotton sample. Thus, the PE/Al/cotton clothing samples showed good warming properties as compared to normal cotton.

To test the washing durability of the clothing fabric, the samples were placed in clean water (400 ml) and stirred by a magnetic stirrer hot plate (Torrey Hills Technologies, LLC) for 30 minutes at 500 rpm and 50° C. We found that the fabric samples maintained their original performance and showed no delamination or destruction.

We tested the water-vapor transmission-rate of the clothing fabric using a test procedure based on ASTM E96. One-hundred ml media bottles (Fisher Scientific) were filled with 60 ml distilled water and sealed by the textile samples using open-top caps and silicone gaskets (Corning). The sealed bottles were then placed into an environmental chamber at 35° C. and 30%±10% relative humidity for 12 hours. The total mass of the bottles together with the samples was measured periodically. The reduced mass, corresponding to the evaporated water, was then divided by the exposed area (7 cm²) to derive the water-vapor transmission-rate. The sample fabrics were found to have good air flexibility and a water-vapor transmission rate similar to that of a woven cotton sample (0.187 g/cm²). More specifically, a knitted PE/Al/cotton sample showed a water-vapor transmission rate of 0.178 g/cm²; and a woven PE/Al/cotton sample showed a water-vapor transmission rate of 0.181 g/cm².

Example 3: Spectrally-Selective Clothing Fabric Having Inorganic Pigment Particles We selected infrared-transparent inorganic nanoparticles as a pigment and polyethylene as a flexible polymer host. The selected infrared-transparent inorganic solids included Prussian blue (PB), iron oxide ($Fe_2O_3$), and silicon (Si). A compounding process was employed to mechanically mix the nanoparticles with melted polyethylene pelts at 180° C. and produce uniform, inorganic-solid-polymer composites. With a mass ratio of 1% nanoparticles, the composites maintained good thermal processability for molding into arbitrary shapes and exhibited satisfactory optical properties in the visible and infrared ranges.

The particle sizes were chosen in the range of 20 nm to 1,000 nm. This nanoscale size range is much smaller than the human body thermal-radiation wavelengths of 4-14 µm. Therefore, the nanoparticles were not expected to induce strong scattering of infrared light or decrease the infrared transparency of the polyethylene mixtures. Indeed, Fourier-transform infrared-spectroscopy measurements illustrated that the inorganic solids had negligible absorbance in the infrared wavelength region of about 4 µm to about 14

μm—except in the intense and narrow peak of Prussian blue at 4.8 μm, due to C≡N stretching vibration and a weak, and the broad peak of silicon at around 8 μm to around 10 μm, due to the native silicon oxide on the surface.

At the same time, high refractive index dielectric or semiconductor nanoparticles in a particular size range can have strong resonant light scattering in the visible spectral range on the basis of Mie theory. As a result, different visible colors can be produced by controlling the nanoscale dimensions of the inorganic particles. For example, in contrast to the black color of bulk silicon, silicon nanoparticles (refractive index less than 3.8 at 633 nm) with diameters of 100 nm to 200 nm exhibit a yellow color, which results from pronounced Mie resonance responses associated with the excitation of both magnetic and electric dipole modes. Both Prussian blue and iron oxide nanoparticles show their natural color as bulk. The intense blue color of Prussian blue is associated with the intervalence charge transfer between Fe(II) to Fe(III), while the dark red color of iron oxide is determined by its optical band gap of about 2.2 eV. With these three primary colors of blue, red, and yellow, all different colors of the visible spectrum can be created by mixing the pigment particles at different ratios.

Because of the uniform distribution of pigment nanoparticles inside the polyethylene polymer matrix, the molded PB-PE, $Fe_2O_3$-PE, and Si-PE composite membranes showed uniform and intense colors of blue, red, and yellow, respectively, with a membrane thickness of about 100 μm. Ultraviolet-visible (UV-VIS) spectroscopy measurements of the composites revealed dominant reflection wavelengths at around 450 nm, 600 nm, and 750 nm, matching well to the original colors of Prussian blue, iron oxide, and silicon nanoparticles, respectively. The strong reflection and absorption of visible light resulted in opacity (defined as 1−specular transmittance) of more than eighty percent in the visible range. Furthermore, in the infrared region, the colored composites all showed high transparency of about 80%, allowing the body radiation heat to transmit into the environment for achieving the radiative cooling effect.

The colored polyethylene composites were extruded into yarns using a high-throughput melt spinning machine. The pigment nanoparticles were uniformly embedded inside the fibers. Mechanical strength tests showed that the colored polyethylene composite yarns could sustain a maximum tensile force of about 1.9 N to about 2.8 N, which is comparable to the cotton yarn used in normal clothing fabrics.

The yarn's mechanical strength enabled further knitting of the yarn into large-scale interlaced fabrics with good breathability, softness, and mechanical strength. With the incorporation of interlaced knitting patterns, the colored polyethylene composite fabrics maintained an infrared transmittance of about eighty percent, which was about the same as that of the planar solid membranes.

Furthermore, the stability and durability of the colored polyethylene fabrics was evaluated by using inductively-coupled plasma mass-spectrometry to measure the concentrations of Fe, K, and Si in the water before and after washing. The negligible change of the ion concentrations confirmed that the Prussian blue, iron oxide, and silicon nanoparticles were firmly wrapped by the polyethylene polymer matrix, which can sustain washing cycles and maintain the original color without releasing pigment nanoparticles into the water.

Finally, we characterized the thermal performance of the colored polyethylene textiles. A rubber insulated flexible heater was used to simulate the heat generation of the skin, and its temperature response was recorded when covered with different textile samples. The entire setup was enclosed in a chamber, and the surrounding air temperature inside the chamber was maintained constant at 25° C. At a heating power density of 80 W/m², which is comparable to the human body metabolic heat generation rate, the bare skin heater showed a temperature of 33.5° C. When the skin heater was covered with a normal cotton textile, the temperature increased to 36.5° C. When covered with the PB-PE, $Fe_2O_3$-PE and Si-PE textiles, the skin temperatures were measured in the range of 34.7 to 34.9° C., demonstrating the fabric's ability to passively cool the human body by 1.6 to 1.8° C. as compared to cotton. This cooling effect is similar to that of the non-colored nanoporous polyethylene, which further confirms the effectiveness of using infrared-transparent pigment nanoparticles for the coloration of radiative textiles.

ASPECTS OF THE DISCLOSURE

Aspect 1. A clothing fabric comprising: an outer layer comprising a polyolefin fiber and particulate fillers dispersed within the polyolefin fiber, the outer layer having a transmittance of infrared radiation at a wavelength of 9.5 μm of at least 38 percent; an intermediate layer comprising a porous metallic film on an inner surface of a porous polyolefin membrane, wherein the porous polyolefin membrane is coupled to an inner surface of the outer layer and has a transmittance of infrared radiation at a wavelength of 9.5 μm of at least 38 percent; and wherein the porous metallic film has a reflectivity of infrared radiation at a wavelength of 9.5 μm of at least 40 percent; and an inner layer coupled to an inner surface of the porous metallic film, the inner layer comprising a fabric selected from a group consisting of cotton, polyester, silk, wool, down, rayon, linen, nylon, hemp, and mixtures thereof; wherein the particulate fillers have an average particle size in a range of 10 nm to 4,000 nm, and wherein the particulate fillers comprise at least one of a metalloid, a metal oxide, a metal halide, a metal sulfide, or a metal cyanide; and wherein the porous metallic film has pores having an average pore size in a range of 10 nm to 4,000 nm.

Aspect 2. The clothing fabric of aspect 1, wherein the intermediate layer has an emissivity of infrared radiation at a wavelength of 9.5 μm on an outer surface of the porous polyolefin membrane in a range of 5 percent to 60 percent.

Aspect 3. The clothing fabric of aspect 2, wherein the particulate fillers comprise at least one of zinc oxide, ferric ferrocyanide, iron oxide, or silicon.

Aspect 4. The clothing fabric of aspect 3, wherein the porous metallic film comprises a metal selected from a group consisting of aluminum, silver, copper, nickel, gold, titanium, tungsten, molybdenum, and alloys thereof.

Aspect 5. The clothing fabric of aspect 4, wherein the porous polyolefin membrane has a thickness in a range of 5 μm to 500 μm.

Aspect 6. The clothing fabric of aspect 5, wherein the porous metallic film has a thickness in a range of 10 nm to 800 nm.

Aspect 7. The clothing fabric of aspect 6, wherein the inner layer is nonwoven, woven, knitted, crocheted, felted, or braided; and wherein the outer layer is nonwoven, woven, knitted, crocheted, felted, or braided.

Aspect 8. The clothing fabric of aspect 7, wherein a weight percentage of the particulate fillers within the polyolefin fiber is at least 0.10 percent.

Aspect 9. The clothing fabric of aspect 8, wherein the porous polyolefin membrane has pores having an average pore size in a range of 10 nm to 4,000 nm.

Aspect 10. The clothing fabric of aspect 9, wherein a volume percentage of the pores within the porous polyolefin membrane is at least 5 percent.

Aspect 11. The clothing fabric of aspect 10, wherein the porous metallic film comprises an interconnected-mesh structure.

Aspect 12. The clothing fabric of aspect 11, wherein the clothing fabric has a water-vapor transmission-rate of at least 0.005 g/cm2/hour.

Aspect 13. The clothing fabric of aspect 12, wherein the clothing fabric has an opacity to visible light over a wavelength range of 400 nm to 700 nm of at least 40 percent.

Aspect 14. The clothing fabric of aspect 13, wherein the outer layer has a thickness in a range of 50 μm to about 800 μm.

Aspect 15. The clothing fabric of aspect 14, wherein the particulate fillers reflect at least one visible color selected from the group consisting of red, orange, yellow, green, blue, purple, black, and white.

Aspect 16. A clothing fabric comprising: a first layer comprising a polyolefin fiber and particulate fillers dispersed within the polyolefin fiber, the first layer having a transmittance of infrared radiation at a wavelength of 9.5 μm of at least 38 percent; a second layer comprising a first porous metallic film on an inner surface of a first porous polyolefin membrane, wherein the first porous polyolefin membrane is coupled to an inner surface of the first layer and has a transmittance of infrared radiation at a wavelength of 9.5 μm of at least 38 percent; and wherein the first porous metallic film has a reflectivity of infrared radiation at a wavelength of 9.5 μm of at least 40 percent; a third layer coupled to an inner surface of the first porous metallic film, the third layer comprising a fabric selected from a group consisting of cotton, polyester, silk, wool, down, rayon, linen, nylon, hemp, and mixtures thereof; a fourth layer comprising a second porous metallic film on an outer surface of a second porous polyolefin membrane, wherein the second porous metallic film is further coupled to an inner surface of the third layer and has a reflectivity of infrared radiation at a wavelength of 9.5 μm of at least 40 percent; and wherein the second porous polyolefin membrane has a transmittance of infrared radiation at a wavelength of 9.5 μm of at least 38 percent; and a fifth layer coupled to an inner surface of the second porous polyolefin membrane, wherein the fifth layer comprises a polyolefin fiber and particulate fillers dispersed within the polyolefin fiber and has a transmittance of infrared radiation at a wavelength of 9.5 μm of at least 38 percent.

Aspect 17. The clothing fabric of aspect 16, wherein the second layer has an emissivity of infrared radiation at a wavelength of 9.5 μm on an outer surface of the first porous polyolefin membrane in a range of 5 percent to 60 percent.

Aspect 18. The clothing fabric of aspect 17, wherein the particulate fillers in each of the first and fifth layers comprise at least one of a metalloid, a metal oxide, a metal halide, a metal sulfide, or a metal cyanide.

Aspect 19. The clothing fabric of aspect 18, wherein the particulate fillers in each of the first and fifth layers comprise at least one of zinc oxide, ferric ferrocyanide, iron oxide, or silicon.

Aspect 20. The clothing fabric of aspect 19, wherein each of the first and second porous metallic films comprises a metal selected from a group consisting of aluminum, silver, copper, nickel, gold, titanium, tungsten, molybdenum, and alloys thereof.

Aspect 21. The clothing fabric of aspect 20, wherein each of the first and second porous polyolefin membranes has a thickness in a range of 5 μm to 500 μm.

Aspect 22. The clothing fabric of aspect 21, wherein each of the first and second porous metallic films has a thickness in a range of 10 nm to 800 nm.

Aspect 23. The clothing fabric of aspect 22, wherein each of the first layer, third layer, and fifth layer is nonwoven, woven, knitted, crocheted, felted, or braided.

Aspect 24. The clothing fabric of aspect 23, wherein the particulate fillers in each of the first and fifth layers have an average particle size in a range of 10 nm to 4,000 nm.

Aspect 25. The clothing fabric of aspect 24, wherein each of the first and second porous metallic films has pores having an average pore size in a range of 10 nm to 4,000 nm.

Aspect 26. The clothing fabric of aspect 25, wherein a weight percentage of the particulate fillers within the polyolefin fiber in each of the first and fifth layers is at least 0.10 percent.

Aspect 27. The clothing fabric of aspect 26, wherein each of the first and second porous polyolefin membranes has pores having an average pore size in a range of 10 nm to 4,000 nm.

Aspect 28. The clothing fabric of aspect 27, wherein a volume percentage of the pores within each of the first and second porous polyolefin membranes is at least 5 percent.

Aspect 29. The clothing fabric of aspect 28, wherein each of the first and second porous metallic films comprises an interconnected-mesh structure.

Aspect 30. The clothing fabric of aspect 29, wherein the clothing fabric has a water-vapor transmission-rate of at least 0.005 g/cm2/hour.

Aspect 31. The clothing fabric of aspect 30, wherein the clothing fabric has an opacity to visible light over a wavelength range of 400 nm to 700 nm of at least 40 percent.

Aspect 32. The clothing fabric of aspect 31, wherein each of the first layer and the fifth layer has a thickness in a range of 50 μm to 800 μm.

Aspect 33. The clothing fabric of aspect 32, wherein the particulate fillers in each of the first and fifth layers reflect at least one visible color selected from the group consisting of red, orange, yellow, green, blue, purple, black, and white.

Aspect 34. A clothing fabric comprising: an outer layer comprising a porous metallic film on an inner surface of a polyolefin layer, wherein the polyolefin layer comprises a polyolefin fiber and particulate fillers dispersed within the polyolefin fiber and has a transmittance of infrared radiation at a wavelength of 9.5 μm of at least 38 percent, and wherein the porous metallic film has a reflectivity of infrared radiation at a wavelength of 9.5 μm of at least 40 percent; and an inner layer coupled to an inner surface of the porous metallic film, the inner layer comprising a fabric selected from a group consisting of cotton, polyester, silk, wool, down, rayon, linen, nylon, hemp, and mixtures thereof; wherein the particulate fillers have an average particle size in a range of 10 nm to 4,000 nm, and wherein the particulate fillers comprise at least one of a metalloid, a metal oxide, a metal halide, a metal sulfide, or a metal cyanide; and wherein the porous metallic film has pores having an average pore size in a range of 10 nm to 4,000 nm.

Aspect 35. The clothing fabric of aspect 34, wherein the outer layer has an emissivity of infrared radiation at a wavelength of 9.5 μm on an outer surface of the polyolefin layer in a range of 5 percent to 60 percent.

Aspect 36. The clothing fabric of aspect 35, wherein the particulate fillers comprise at least one of zinc oxide, ferric ferrocyanide, iron oxide, or silicon.

Aspect 37. The clothing fabric of aspect 36, wherein the porous metallic film comprises a metal selected from a group consisting of aluminum, silver, copper, nickel, gold, titanium, tungsten, molybdenum, and alloys thereof.

Aspect 38. The clothing fabric of aspect 37, wherein the porous metallic film has a thickness in a range of 10 nm to 800 nm.

Aspect 39. The clothing fabric of aspect 38, wherein each of the inner layer and outer layer is nonwoven, woven, knitted, crocheted, felted, or braided.

Aspect 40. The clothing fabric of aspect 39, wherein a weight percentage of the particulate fillers within the polyolefin fiber is at least 0.10 percent.

Aspect 41. The clothing fabric of aspect 40, wherein the porous metallic film comprises an interconnected-mesh structure.

Aspect 42. The clothing fabric of aspect 41, wherein the clothing fabric has a water-vapor transmission-rate is at least 0.005 g/cm2/hour.

Aspect 43. The clothing fabric of aspect 42, wherein the clothing fabric has an opacity to visible light over a wavelength range of 400 nm to 700 nm of at least 40 percent.

Aspect 44. The clothing fabric of aspect 43, wherein the polyolefin layer has a thickness in a range of 50 μm to 800 μm.

Aspect 45. The clothing fabric of aspect 44, wherein the particulate fillers reflect at least one visible color selected from the group consisting of red, orange, yellow, green, blue, purple, black, and white.

Aspect 46. A clothing fabric comprising: an outer layer comprising a first porous metallic film on an inner surface of a first polyolefin layer, wherein the first polyolefin layer comprises a polyolefin fiber and particulate fillers dispersed within the polyolefin fiber and has a transmittance of infrared radiation at a wavelength of 9.5 μm of at least 38 percent; and wherein the first porous metallic film has a reflectivity of infrared radiation at a wavelength of 9.5 μm of at least 40 percent; an intermediate layer coupled to an inner surface of the first porous metallic film, the intermediate layer comprising a fabric selected from a group consisting of cotton, polyester, silk, wool, down, rayon, linen, nylon, hemp, and mixtures thereof; and an inner layer comprising a second porous metallic film on an outer surface of a second polyolefin layer, wherein the second porous metallic film is further coupled to an inner surface of the intermediate layer and has a reflectivity of infrared radiation at a wavelength of 9.5 μm of at least 40 percent; and wherein the second polyolefin layer comprises a polyolefin fiber and particulate fillers dispersed within the polyolefin fiber and has a transmittance of infrared radiation at a wavelength of 9.5 μm of at least 38 percent.

Aspect 47. The clothing fabric of aspect 46, wherein the outer layer has an emissivity of infrared radiation at a wavelength of 9.5 μm on an outer surface of the first polyolefin layer in a range of 5 percent to 60 percent.

Aspect 48. The clothing fabric of aspect 47, wherein the particulate fillers within the polyolefin fiber in each of the outer and inner layers comprise at least one of a metalloid, a metal oxide, a metal halide, a metal sulfide, or a metal cyanide.

Aspect 49. The clothing fabric of aspect 48, wherein the particulate fillers within the polyolefin fiber in each of the outer and inner layers comprise at least one of zinc oxide, ferric ferrocyanide, iron oxide, or silicon.

Aspect 50. The clothing fabric of aspect 49, wherein each of the first and second porous metallic films comprises a metal selected from a group consisting of aluminum, silver, copper, nickel, gold, titanium, tungsten, molybdenum, and alloys thereof.

Aspect 51. The clothing fabric of aspect 50, wherein each of the first and second porous metallic films has a thickness in a range of 10 nm to 800 nm.

Aspect 52. The clothing fabric of aspect 51, wherein each of the first polyolefin layer, the intermediate layer, and the second polyolefin layer is nonwoven, woven, knitted, crocheted, felted, or braided.

Aspect 53. The clothing fabric of aspect 52, wherein each of the first and second porous metallic films has pores having an average pore size in a range of 10 nm to 4,000 nm.

Aspect 54. The clothing fabric of aspect 53, wherein a weight percentage of the particulate fillers within the polyolefin fiber in each of the outer and inner layers is at least 0.10 percent.

Aspect 55. The clothing fabric of aspect 54, wherein the particulate fillers in each of the outer and inner layers have an average particle size in a range of 10 nm to 4,000 nm.

Aspect 56. The clothing fabric of aspect 55, wherein each of the first and second porous metallic films comprises an interconnected-mesh structure.

Aspect 57. The clothing fabric of aspect 56, wherein the clothing fabric has a water-vapor transmission-rate is at least 0.005 g/cm2/hour.

Aspect 58. The clothing fabric of aspect 57, wherein the clothing fabric has an opacity to visible light over a wavelength range of 400 nm to 700 nm of at least 40 percent.

Aspect 59. The clothing fabric of aspect 58, wherein each of the first polyolefin layer and the second polyolefin layer has a thickness in a range of 50 μm to 800 μm.

Aspect 60. The clothing fabric of aspect 59, wherein the particulate fillers within the polyolefin fiber in each of the outer and inner layers reflect visible colors.

The invention has been described in detail with reference only to the presently preferred embodiments. Persons skilled in the art will appreciate that various modifications can be made without departing from the invention. Accordingly, the invention is defined only by the following claims.

The invention claimed is:

1. A clothing fabric comprising:
an outer polyolefin layer comprising a polyolefin fiber and particulate fillers dispersed within the polyolefin fiber, the outer polyolefin layer having a transmittance of infrared radiation at a wavelength of 9.5 μm of at least 38 percent;
an intermediate layer comprising a porous polyolefin membrane and a porous metallic film on an inner surface of the porous polyolefin membrane, wherein the porous polyolefin membrane is coupled to an inner surface of the outer polyolefin layer and has an emissivity of infrared radiation at a wavelength of 9.5 μm on an outer surface of the porous polyolefin membrane of 5-25 percent; wherein the porous polyolefin membrane has a thickness in a range of 5 μm to 500 μm; and wherein the porous metallic film has a reflectivity of infrared radiation at a wavelength of 9.5 μm of at least 40 percent; and
an inner layer coupled to an inner surface of the porous metallic film, the inner layer comprising a fabric selected from a group consisting of cotton, polyester, silk, wool, down, rayon, linen, nylon, hemp, and mixtures thereof;
wherein the porous polyolefin membrane is sandwiched between and in contact with the porous metallic film and the outer polyolefin layer;

wherein the porous metallic film is sandwiched between and in contact with the porous polyolefin membrane and the inner layer;

wherein the particulate fillers have an average particle size in a range of 10 nm to 4,000 nm and have a weighted average transmittance of infrared radiation over a wavelength range of 7-14 μm of at least about 30%, and wherein the particulate fillers comprise at least one of a metalloid, a metal oxide, a metal halide, a metal sulfide, or a metal cyanide; and wherein the porous metallic film has pores having an average pore size in a range of 10 nm to 4,000 nm and comprises an interconnected-mesh structure.

2. The clothing fabric of claim 1, wherein the particulate fillers comprise at least one of zinc oxide, ferric ferrocyanide, iron oxide, or silicon.

3. The clothing fabric of claim 2, wherein the porous metallic film comprises a metal selected from a group consisting of aluminum, silver, copper, nickel, gold, titanium, tungsten, molybdenum, and alloys thereof.

4. The clothing fabric of claim 3, wherein the porous metallic film has a thickness in a range of 10 nm to 800 nm.

5. The clothing fabric of claim 4, wherein the inner layer is nonwoven, woven, knitted, crocheted, felted, or braided; and wherein the outer polyolefin layer is nonwoven, woven, knitted, crocheted, felted, or braided.

6. The clothing fabric of claim 5, wherein a weight percentage of the particulate fillers within the polyolefin fiber is at least 0.10 percent.

7. The clothing fabric of claim 6, wherein the porous polyolefin membrane has pores having an average pore size in a range of 10 nm to 4,000 nm.

8. The clothing fabric of claim 7, wherein a volume percentage of the pores within the porous polyolefin membrane is at least 5 percent.

9. The clothing fabric of claim 1, wherein the clothing fabric has a water-vapor transmission-rate of at least 0.005 g/cm²/hour.

10. The clothing fabric of claim 9, wherein the clothing fabric has an opacity to visible light over a wavelength range of 400 nm to 700 nm of at least 40 percent.

11. The clothing fabric of claim 10, wherein the outer polyolefin layer has a thickness in a range of 50 μm to about 800 μm.

12. The clothing fabric of claim 11, wherein the particulate fillers reflect at least one visible color selected from the group consisting of red, orange, yellow, green, blue, purple, black, and white.

13. A clothing fabric comprising:
a first layer comprising a first polyolefin fiber and first particulate fillers dispersed within the first polyolefin fiber, the first layer having a transmittance of infrared radiation at a wavelength of 9.5 μm of at least 38 percent;
a second layer comprising a first porous polyolefin membrane and a first porous metallic film on an inner surface of the first porous polyolefin membrane, wherein the first porous polyolefin membrane has an outer surface coupled to an inner surface of the first layer and has an emissivity of infrared radiation at a wavelength of 9.5 μm on the outer surface of the first porous polyolefin membrane of 5-25 percent; wherein the first porous polyolefin membrane has a thickness in a range of 5 μm to 500 μm; and wherein the first porous metallic film has a reflectivity of infrared radiation at a wavelength of 9.5 μm of at least 40 percent;
a third layer coupled to an inner surface of the first porous metallic film, the third layer comprising a fabric selected from a group consisting of cotton, polyester, silk, wool, down, rayon, linen, nylon, hemp, and mixtures thereof;
a fourth layer comprising a second porous polyolefin membrane and a second porous metallic film on an outer surface of the second porous polyolefin membrane, wherein the second porous metallic film is further coupled to an inner surface of the third layer and has a reflectivity of infrared radiation at a wavelength of 9.5 μm of at least 40 percent; and wherein the second porous polyolefin membrane has an emissivity of infrared radiation at a wavelength of 9.5 μm on the outer surface of the second porous polyolefin membrane of 5-25 percent; wherein the second porous polyolefin membrane has a thickness in a range of 5 μm to 500 μm; and
a fifth layer coupled to an inner surface of the second porous polyolefin membrane, wherein the fifth layer comprises a second polyolefin fiber and second particulate fillers dispersed within the second polyolefin fiber and has a transmittance of infrared radiation at a wavelength of 9.5 μm of at least 38 percent,
wherein the first porous polyolefin membrane is sandwiched between and in contact with the first porous metallic film and the first layer;
wherein the first porous metallic film is sandwiched between and in contact with the first porous polyolefin membrane and the third layer and comprises an interconnected-mesh structure; and
wherein the first and second particulate fillers have an average particle size in a range of 10 nm to 4,000 nm and have a weighted average transmittance of infrared radiation over a wavelength range of 7-14 μm of at least about 30%.

14. The clothing fabric of claim 13, wherein the first and second particulate fillers in the first and fifth layers, respectively, comprise at least one of a metalloid, a metal oxide, a metal halide, a metal sulfide, or a metal cyanide.

15. The clothing fabric of claim 14, wherein the first and second particulate fillers in the first and fifth layers, respectively, comprise at least one of zinc oxide, ferric ferrocyanide, iron oxide, or silicon.

16. The clothing fabric of claim 15, wherein each of the first and second porous metallic films comprises a metal selected from a group consisting of aluminum, silver, copper, nickel, gold, titanium, tungsten, molybdenum, and alloys thereof.

* * * * *